United States Patent [19]

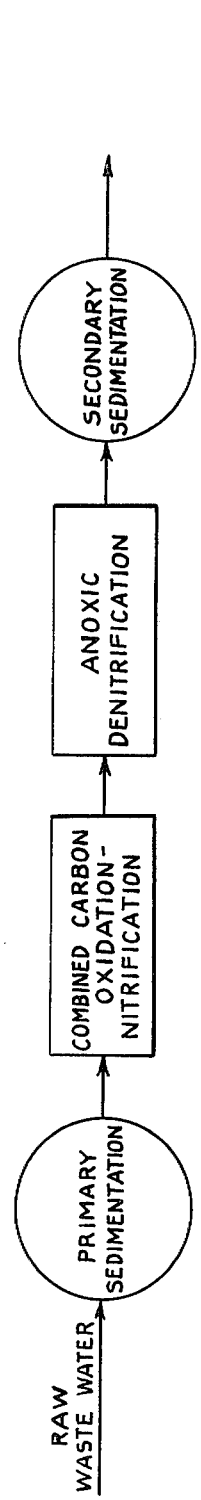
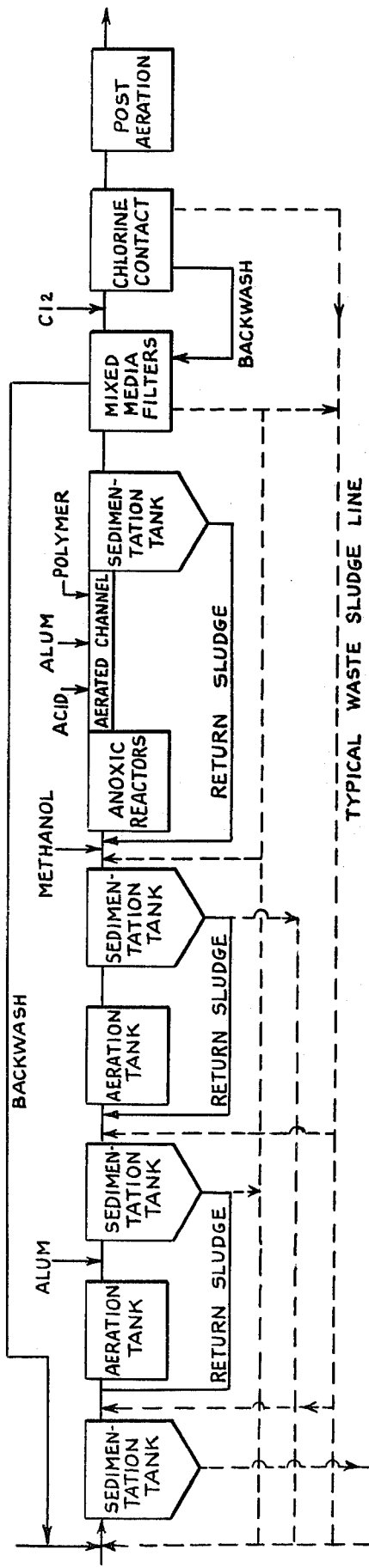
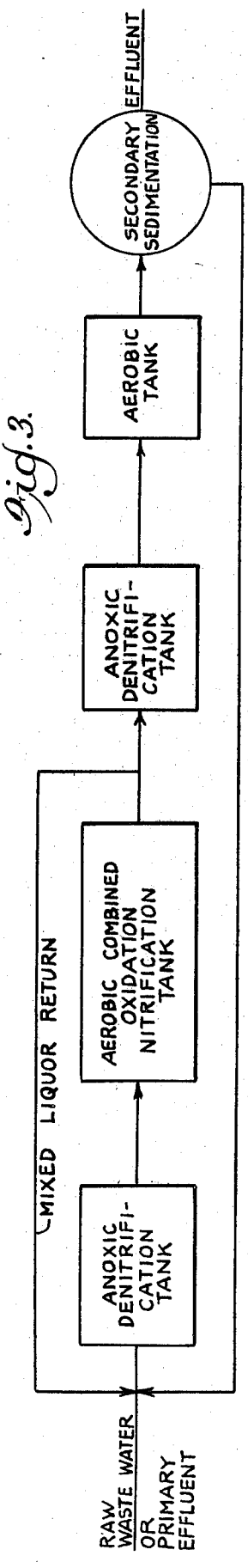

Mandt

[11] 4,290,884

[45] Sep. 22, 1981

[54] NITRIFICATION-DENITRIFICATION SYSTEM

[75] Inventor: Mikkel G. Mandt, Cedar Falls, Iowa

[73] Assignee: Clevepak Corporation, White Plains, N.Y.

[21] Appl. No.: 179,239

[22] Filed: Aug. 18, 1980

Related U.S. Application Data

[63] Continuation of Ser. No. 936,910, Aug. 25, 1978, abandoned.

[51] Int. Cl.³ .................................................. C02F 3/30
[52] U.S. Cl. .................................. 210/195.3; 210/202; 210/605; 210/903
[58] Field of Search .................. 210/194, 195.3, 195.4, 210/201, 202, 205, 207, 208, 220, 903, 605, 621, 623, 624, 626, 630

[56] References Cited

U.S. PATENT DOCUMENTS

| | | |
|---|---|---|
| 3,733,263 | 5/1973 | Mandt ................................. 210/625 |
| 3,809,242 | 5/1974 | Bosje ................................. 210/195.3 |
| 3,900,394 | 8/1975 | Rongved ............................. 210/629 |

OTHER PUBLICATIONS

Envirotech Corporation Pamphlet; "Eimco Carrousel Biological Oxidation System"; (1977).
Gool H. Van; "Purification of Industrial Waste Waters; Centre Belge d'Etude et de Documentation des Eaux"; No. 391-392; pp. 265-279 (1976).

Primary Examiner—Benoit Castel
Attorney, Agent, or Firm—Cushman, Darby & Cushman

[57] ABSTRACT

Activated sludge treatment system for removal of pretreatment BOD and nitrogen values from waste water, utilizing a mixed liquor tank comprising a nitrate cracking channel zone, a denitrification channel zone and an aeration zone in specified relationship and adapted to provide specified operating conditions in the respective zones.

3 Claims, 5 Drawing Figures

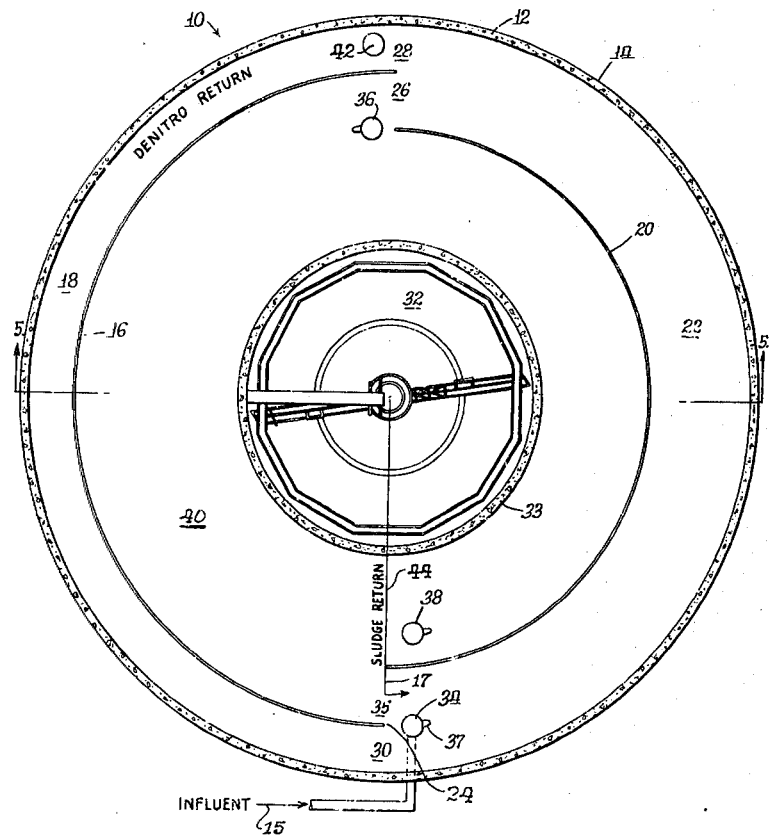

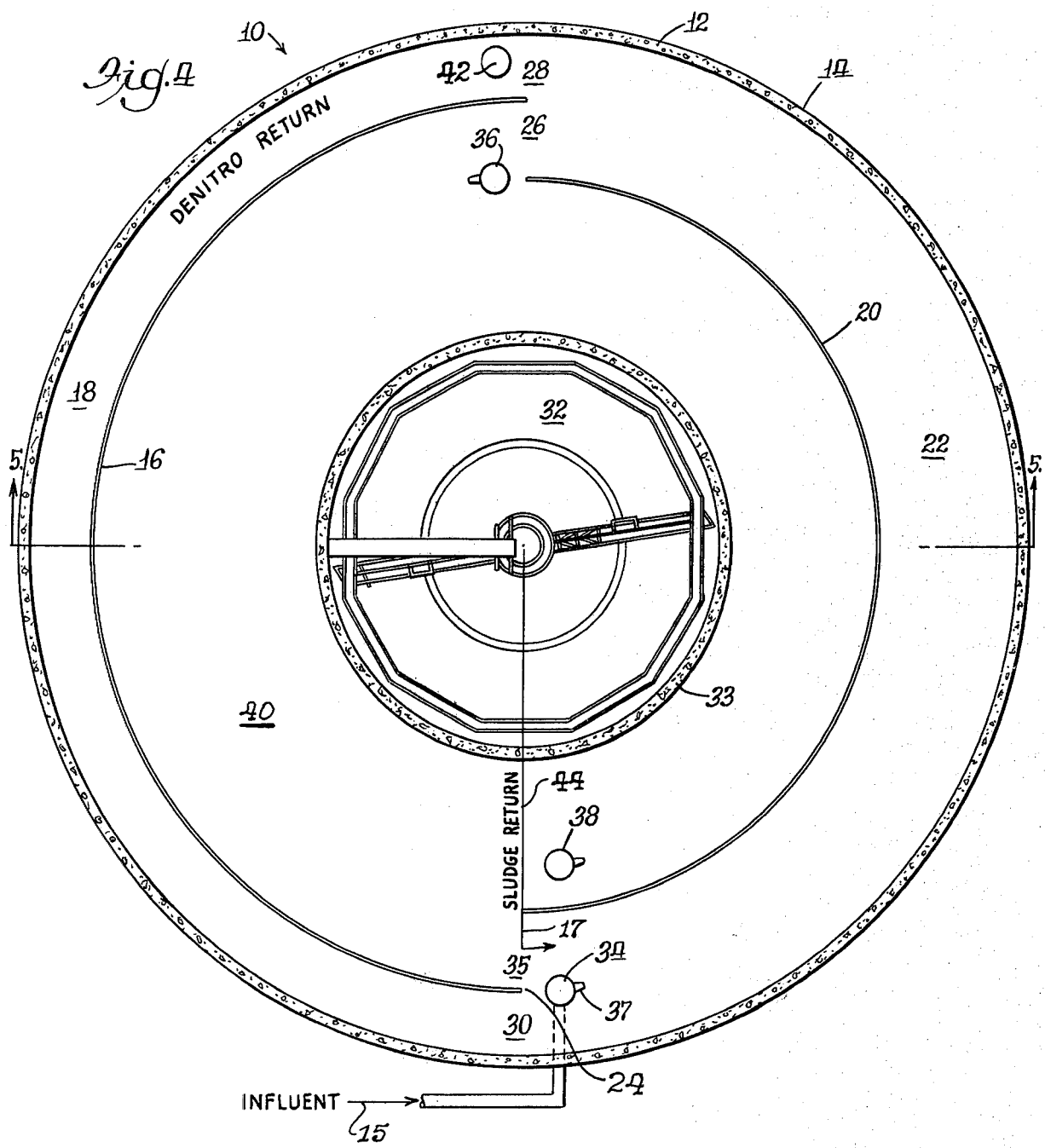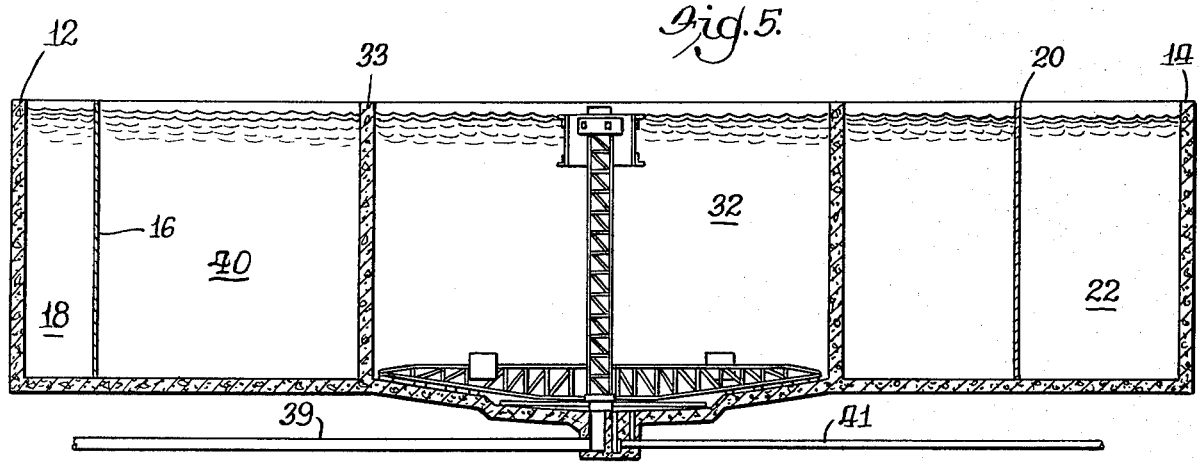

NITRIFICATION-DENITRIFICATION SYSTEM

This is a continuation of application Ser. No. 936,910, filed Aug. 25, 1978, now abandoned.

The present invention is directed to apparatus for treatment of waste water and more particularly is directed to such apparatus which are particularly adapted to the treatment of waste water such as sewage effluent, which has the capability to perform aeration for removal of waste water BOD and to perform nitrification and denitrification of the waste water to carry out nitrogen removal from the waste water subjected to treatment.

The nitrification-denitrification of waste water has long been recognized as occurring in waste water treatment plants, and the removal of nitrification values from waste water has received considerable attention in the art [e.g., see Painter, Water Res. 4, 393 (1970); Prakasam, et al., Water Res. 6,859 (1972); Wuhrmann, Advances in Water Quality Improvement, Vol. 1, U. Texas Press (1968); Adams, et al., Process Design Technology for Industrial Waste Treatment, Environ Press (1974); Sutton, Journal Water Pollution Control Federation, 47, 122 (1975); Hutton, et al., Journal Water Pollution Control Federation, 47, 989 (1975)].

Illustrated in FIGS. 1-3 are several conventional systems for waste water denitrification. FIG. 1 illustrates a process flowsheet sequential carbon oxidation-nitrification-denitrification system in which the sludge is exposed to alternating aerobic and anoxic environments so that ammonia is subjected to nitrification and subsequent denitrification conditions.

Nitrification-denitrification systems such as shown in FIG. 1 may be modified by placing a short anoxic cell prior to a combined carbon oxidation-nitrification tank. [Beer, et al., Tech Paper 32, New York State Department of Environmental Conservation (1974)]. FIG. 2 illustrates a "three sludge" system having three separate suspended growth (activated sludge) stages for organic carbon oxidation, nitrification and denitrification.

Similarly, FIG. 3 illustrates a further system in which mixed liquor containing nitrate is recycled from an aerobic tank to an initial anoxic tank for denitrification. Another anoxic tank appended to the first two tanks is used for removing nitrate remaining in the effluent from the second aerobic tank, while a final flash aeration is provided to elevate the dissolved oxygen in the final effluent. [Barnard, Journal Water Pollution Control Federation, 11, 33 (1974)].

However, such conventional systems have various disadvantages and are relatively complicated, and effective denitrification systems of relatively simple design would be desirable. Further, such systems which might be utilized to adapt conventional treatment facilities to provide denitrification of waste water would also be desirable.

Accordingly, it is an object of the present invention to provide such systems for carrying out the oxidation and denitrification of waste water. This and other objects of the invention will become apparent from the detailed description and the accompanying drawings of which:

FIG. 1 is a process flow sheet of a conventional sequential carbon-oxygen-nitrification-denitrification system;

FIG. 2 is a process flow sheet for a conventional "three sludge" denitrification system;

FIG. 3 is a process flow sheet of another conventional sequential denitrification system;

FIG. 4 is a plan view of an oxygen-nitrification-denitrification system in accordance with the present invention; and FIG. 5 is a cross sectional view of the system of FIG. 4 taken through line 5—5.

Generally, the present invention is directed to activated sludge systems comprising or utilizing a mixed liquor zone for receiving and aerating waste water influent having pretreatment biological oxygen demand (BOD) and nitrogen values. For a typical municipal sewage, the BOD values may be in the range of about 100 mg/l to about 300 mg/l, and the total nitrogen content may be in the range of from about 10 mg/l to about 50 mg/l. The system also may include clarifier means for receiving and clarifying mixed liquor from the aeration zone to produce a clarified, treated product stream having reduced BOD and nitrogen values in respect of the pretreatment values, and for providing a return sludge flow to the mixed liquor zone. The mixed liquor zone itself comprises means defining a plurality of different treatment subzones including a nitrification zone, a denitrification zone, and an aeration zone. The mixed liquor zone further should be provided with means for aerating mixed liquor in the aeration zone, and for imparting directional momentum to the mixed liquor for circulating the mixed liquor between the subzones in a predetermined manner.

Turning now to the drawings of FIGS. 4 and 5, the invention will be more particularly described with respect to embodiment 10 of a waste water treatment system adapted to perform aeration, nitrification, denitrification and clarification of waste water such as raw or pretreated sewage in a single basin. The illustrated system comprises one basin which may be, in the illustrated embodiment, about 40 feet in diameter, and having a total hydraulic retention time of about 28 hours. The system is adapted to handle a 0.1 million gallons per day (MGD) flow and to transfer 18 pounds per hour of oxygen at standard conditions in the treatment of waste water.

The system 10 comprises a circular reinforced concrete basin 12 bounded by an outer structural wall 14. The circular tank defined by wall 12 has a semicircular baffle 16 at one side of the circular tank 12 adjacent the exterior wall 14, which in the illustrated embodiment may be located at a radial distance of about 17 feet from the tank center. The baffle 16 together with the exterior wall 14 forms an open-ended denitrification return channel 18, which functions in a manner that will be more fully described hereinafter. At the other side of the tank 12 is a second semicircular baffle 20 which together with the exterior wall 14 similarly forms a denitrification, or "nitrate cracking" channel 22. The illustrated baffle 20 is located radially inwardly of the baffle 16, such as at a radial distance of about 15 feet, in order that the inlet zone 24 and the outlet zone 26 of the nitrate cracking channel 22 are larger than the denitrification return channel inlet and outlet zones 28, 30, respectively, for reasons which will become apparent in the description of the operation of the system 10.

At the central portion of the system 10, there is provided a clarifier 32, which may be of conventional design and which in the illustrated embodiment has an outer radius of about 8 feet. The clarifier 32 is separated from the mixed liquor tank 12 by interior tank wall 33 which is also of reinforced concrete construction.

The mixed liquor tank 12 of system 10 is also provided with a plurality of directional jet aeration means for imparting momentum into the mixed liquor. It is noted that aeration apparatus such as apparatus of the jet aeration apparatus utilizing a motive liquid stream may efficiently serve as both momentum-imparting and aerating means.

In the illustrated embodiment, jet aeration means of the ejector type which are adapted to receive and discharge a pressurized motive liquid stream and a pressurized air stream through a nozzle are used for both aeration and directional momentum transfer to the mixed liquor. In this connection, jet aerator 34 is provided at the inlet zone 24 of the nitrate cracking channel 22, which comprises a nozzle 37 and a submersible pump 35 for pressurizing the liquid motive stream to the nozzle 37. The discharge from nozzle 37 is directed into the channel 22 and in a counterclockwise direction about the mixed liquor tank 12. The tank 12 is also provided with similar jet aeration units 36, 38, at an interior portion of the mixed liquor tank and at the discharge zone 26 of the nitrate cracking channel 22. The jet aeration units 36, 38 also have respective discharge directions, as indicated in the drawing, which are generally counterclockwise with respect to the circular tank 12. A similar jet unit 42 with a counterclockwise directional discharge is located at the influent zone 30 of the denitrification return channel 18. In normal use, no air is supplied to the unit 42, and it is consequently used only as a directional jet mixer and momentum transfer device. However, although the unit 42 will not generally be used for aeration, it has the capability for such use if desired.

Each of the illustrated jet aerators 34, 36, 38, 42 may be of the 200 JA type manufactured by the Pentech Division of Houdaille Industries, Inc. and is provided with a one horsepower submersible pump for powering of the motive stream of the jet. The illustrated embodiment has two jet aerators 36, 38 in the aeration zone 40 which are continuously supplied with compressed air in normal operation, and each of which is provided with a one horsepower submersible pump as previously indicated. Air may be supplied to the jets 38, 36 by a conventional positive displacement or centrifugal blower. The mixing jets 34, 42 are of the same construction, but are not normally supplied with compressed air in view of the anaerobic nature of the reaction conditions desired in the denitrification return channel 18 and the nitrate cracking channel 22, but these jets may be supplied similarly by a standard positive displacement or centrifugal blower, as desired, for conditions where it is necessary to increase dissolved oxygen content of the fluid, such as when it is necessary to avoid septic conditions. All of the jets 34, 36, 38, 42 are located adjacent the bottom of the tank 12 (which may be, for example, 15–20 feet deep) with discharge nozzles directed in a generally horizontal direction.

In operation of the system 10, the waste influent to be treated is introduced into the mixed liquor of the tank 12 at the inlet zone 24 of the nitrate cracking channel 22. The influent may be introduced directly into the zone 12, but in the illustrated embodiment is introduced by pumping of the influent as a motive stream for the jet aeration mixing jet 34. Return sludge 44 from the clarifier 32 is also introduced into the mixed liquor of the tank 12 at the influent zone 24 of the nitrate cracking channel 22, and similarly may be introduced as a jet motive stream. In this manner, through the introduction of the influent and introduction of the return sludge at the inlet zone of the channel 22, a high solids concentration is maintained in the nitrate cracking channel 22. In this connection, as indicated previously, the flow of the mixed liquor in the illustrated embodiment 10 is counterclockwise and the momentum imparting jet systems 34, 36, 38, 42 are oriented to provide such counterclockwise flow. Accordingly, the flow through the denitrification zone 22 proceeds at a relatively slow average velocity from the inlet zone 24, around the outer periphery of the nitrate cracking channel 22 defined by the baffle 20 and exterior wall 14, to the outlet portion 26 of the channel, without substantial mixing with other mixed liquor in the tank 12. Because of the illustrated design of the system, and the indicated general counterclockwise flow direction, it will be appreciated that the flow components entering the channel 22 comprises substantially all of the outflow from the exit zone 30 of the denitrification return channel 18, the influent flow 15 of raw sewage to be treated, the return sludge flow 17 from clarifier 32, and a portion of the mixed liquor from the central activated sludge oxidation zone 40.

In connection with these various flow components introduced into the zone 22, the denitrification return channel outflow component entering the channel 22 from zone 18 has a very low dissolved oxygen content such as about 0.1 mg per liter or less of oxygen, and contains ammonia from the anaerobic treatment conditions maintained in the denitrification return channel 18, as will be explained in more detail. The incoming flow component to the channel 22 from the activated sludge oxidation zone 40 has been subjected to aeration conditions and has relatively higher dissolved oxygen levels of, for example, at least about 1.0 mg per liter and preferably at least 2.0 mg per liter consistent with the biological oxidation function of the zone 40. Further, under the oxidation conditions, an aerobic biomass functioning under aerobic conditions develops in the zone 40, and the removable, free nitrogen content of the flow from zone 40 is substantially in the form of nitrate. The influent flow and the return sludge flow components to the channel 22 provide additional carbonaceous material to the zone 22, which accordingly has components for denitrification through endogenous nitrate respiration, and the zone 22 is maintained under endogenous nitrate respiration conditions which promote denitrification. In this connection, the influent components are mixed at the channel 22 input zone 24 by fluid jet 34, and the dissolved oxygen content is maintained at a relative low level of about 0.5 mg per liter or less, under control of aeration capability of jet 34. The average flow rate around the channel 22 is such that the biomass is conditioned to the denitrification conditions and a substantial portion of the soluble nitrate component is removed; in the embodiment 10, the average channel velocity should be in the range of about 0.3 feet per second to about 1.5 feet per second so that the average retention time of the flow in transit from the entrance 24 to the exit 26 of the channel 22 is in the range of about 0.5 minutes to about 4 minutes. The retention times in larger systems will be correspondingly proportional to the length of the channel. Under these conditions, the interaction of components and the biological conditions in the nitrate cracking channel 22 are adapted to provide for denitrification reaction in the zone 22 involving consumption of ammonia and nitrate, and release of nitrogen.

At the outlet 26 of the zone 22, a portion of the denitrified effluent from the zone 22 is conducted into the inlet 28 and through the denitrification return channel 18. This portion of the flow is maintained in the denitrification return channel at low oxygen levels less than or equal to 0.1 mg per liter of oxygen. Accordingly, a portion of the flow is continuously maintained under oxygen limited conditions suitable for denitrification reaction, and this flow and the appropriated aged and conditioned biomass adapted to such conditions constitute an important inflow component to the nitrate cracking channel 22, as previously described.

Another portion of the outflow from zone 22 issues from the exit 26 into the internally located activated sludge oxidation channel basin zone 40. Aeration jet 38 of the ejector type is provided at the exit 26 to introduce oxygen to the fluid entering the zone 40, to provide rapid mixing with the mixed liquor in the zone 40, and to impart directional momentum. It is desired to maintain the mixed liquor in the zone 40 under endogneous oxidation respiration conditions. In this connection, a plurality of jet aerators (e.g., including jet aerator 36) may be provided within the zone 40. Effective aeration conditions should be maintained, and in this connection, a dissolved oxygen content of 2.0–2.5 mg liter may desirably be maintained in the zone 40. The mixed liquor in the zone 40 is substantially thoroughly mixed in the zone, and is provided with a general counterclockwise motion corresponding to the direction of motion of the fluid in the denitrification return channel 18 and the nitrate cracking channel 22. Upon travel around the zone 40, a portion of the mixed liquor therein will be conducted into the denitrification channel 22 as previously described. Further, any ammonia content of the outflow from the channel 22 which enters the aeration zone 40 will be nitrified and the floc will be purged of nitrogen gas and conditioned for settling in the clarifier 32. Under these conditions of operation, a relatively simple system is provided in which are maintained zones for aeration and zones for denitrification, to which the mixed liquor is continuously circulated for nitrogen and BOD removal.

A portion of the mixed liquor from the zone 40 is continuously (or intermittently) removed, generally at a rate corresponding to the rate of introduction of the sewage influent to be treated by the system 10, and conducted to the centrally located clarifier 32. The zone 40 effluent may desirably be removed at a position in the oxidation zone 40 immediately preceeding the exit 28 of the channel 22, in terms of flow direction in the zone 40, so that oxidation, mixing and floc development are optimized. The clarifier 32, which is shown in more detail in FIG. 5, may be of any effective conventional circular clarifier design. The clarifier 32 functions to settle and collect the sludge, and to provide a return sludge component to the system to maintain a high sludge concentration in the mixed liquor in the channel 22 of the system 10. A portion of the sludge output 39 may be removed from the system and disposed of in accordance with conventional practice. The clarifier also provides a clarified effluent output 41 which may be conducted to subsequent treatment steps in accordance with the known art.

While the present invention has been particularly described with respect to the illustrated embodiment, it will be appreciated that variations, adaptations and modifications will be apparent based on the present disclosure and are intended to be within the spirit and scope of the invention as defined by the following claims.

What is claimed is:

1. An activated sludge treatment system for removal of pretreatment BOD and nitrogen values from waste water, comprising a mixed liquor tank and a clarifier centrally located at the interior of said mixed liquor tank for receiving mixed liquor from said mixed liquor tank for providing a clarified effluent and a return sludge component for return to said mixed liquor tank,
   said mixed liquor tank comprising partition means for defining in said tank an aeration zone for maintaining mixed liquor biomass therein under endogenous oxygenation respiration conditions, a nitrate cracking channel adjacent said aeration zone for maintaining mixed liquor biomass therein under endogenous nitrate respiration conditions, and a dentrification return channel adjacent said aeration zone for maintaining mixed liquor biomass therein under oxygen-limited denitrification reaction conditions, said denitrification return channel and said nitrate cracking channel adjoining each other at the respective ends thereof and together forming a substantially continuous nitrification-denitrification channel surrounding said aeration zone, said nitrate cracking channel being in fluid communication at a first end thereof with a respective first end of said denitrification return channel and with said aeration zone for receiving aerated mixed liquor from said aeration zone and substantially all of the oxygen-limited mixed liquor discharge from said denitrification return channel, and said nitrate cracking channel being in fluid communication at a second end thereof with said aeration zone and a respective second end of said denitrification return channel for mixed liquor discharge thereto such that a first portion of the discharge from said nitrate cracking channel is received by said aeration zone and a second portion of said discharge is received by said second end of said denitrification return channel, said denitrification channel being adapted to maintain under anoxic conditions said second portion of the mixed liquor discharge received from said nitrate cracking channel and discharged to said second end of said nitrate cracking channel such that mixed liquor flowing around said aeration zone in said nitrification-denitrification channel is maintained and conditioned under oxygen limited conditions suitable for denitrification,
   means for aerating the mixed liquor in said aeration zone, and means for establishing a flow pattern in said mixed liquor tank such that mixed liquor from said aeration zone and substantially all of the discharge from said denitrification return channel flow into said nitrate cracking channel, and mixed liquor from said nitrate cracking channel flows into both said aeration zone and said denitrification return channel,
   means for introducing waste water influent to be treated into the nitrate cracking channel,
   means for conducting mixed liquor from said aeration zone to said clarifier, and
   means for conducting return sludge from said clarifier to said first end of said nitrate cracking channel.

2. Apparatus in accordance with claim 1 wherein said flow pattern means comprises a plurality of jet aerators.

3. Apparatus in accordance with claim 1 wherein said denitrification return channel and said nitrate cracking channel are each defined in part by an exterior wall of said mixed liquor tank.

* * * * *